United States Patent [19]

Schlueter

[11] 4,406,329
[45] Sep. 27, 1983

[54] AGRICULTURAL TOOL CART FOR MINIMUM TILLAGE AND SEED PLANTING

[76] Inventor: Brune G. Schlueter, Rt. #49, Ogden, Ill. 61859

[21] Appl. No.: 176,970

[22] Filed: Aug. 11, 1980

[51] Int. Cl.³ .................. A01B 25/00; A01B 37/00
[52] U.S. Cl. .................................. 172/310; 111/52; 172/413; 172/443; 172/640; 172/676
[58] Field of Search ................ 172/47, 63, 71, 134, 172/142, 145, 146, 148, 175, 177, 179, 310, 311, 315, 316, 318, 319, 326, 327, 328, 396, 400, 413, 439, 443, 448, 451, 456, 488, 504, 658, 659, 660, 680, 739, 297, 298, 60, 633; 280/408; 111/1, 7, 52, 53, 54, 55, 56, 57, 59, 61, 66, 85

[56] References Cited

U.S. PATENT DOCUMENTS

| | | | |
|---|---|---|---|
| 1,381,393 | 6/1921 | Bevill | 172/659 |
| 2,655,851 | 10/1953 | Pursche | 172/316 X |
| 2,754,740 | 7/1956 | Kirby | 172/297 |
| 2,944,615 | 7/1960 | Clark | 172/456 |
| 3,021,908 | 2/1962 | Dlugosch | 172/466 |
| 3,173,497 | 3/1965 | French | 172/456 |
| 3,314,386 | 4/1967 | Kopaska | 111/52 |
| 3,529,674 | 9/1970 | Todd et al. | 172/311 |
| 3,542,138 | 11/1970 | Fackler | 172/311 X |
| 3,548,954 | 12/1970 | Lindemann | 172/311 |
| 3,568,777 | 3/1971 | Hook | 172/311 X |
| 3,640,345 | 2/1972 | Sosalla | 172/311 |
| 3,700,040 | 10/1972 | Sosalla | 172/311 |
| 3,974,880 | 8/1976 | Filan et al. | 172/443 |
| 4,019,643 | 4/1977 | Kampman et al. | 214/505 |
| 4,119,155 | 10/1978 | Rifflart | 172/311 |
| 4,120,365 | 10/1978 | Kuhn | 172/448 |
| 4,211,288 | 7/1980 | Applequist | 172/328 |
| 4,214,637 | 7/1980 | Applequist | 172/484 |
| 4,217,962 | 8/1980 | Schaefer | 172/326 X |

FOREIGN PATENT DOCUMENTS

| | | | |
|---|---|---|---|
| 1394996 | 3/1965 | France | 172/443 |
| 2278235 | 2/1976 | France | 172/443 |
| 2379976 | 9/1978 | France | 172/439 |
| 494136 | 3/1976 | U.S.S.R. | 172/488 |

OTHER PUBLICATIONS

Dakon Agricultural Catalog (1972)–pp.55; 64.

Primary Examiner—Richard T. Stouffer
Attorney, Agent, or Firm—Wood, Dalton, Phillips, Mason & Rowe

[57] ABSTRACT

An agricultural tool cart having structure for towing a three-point hitch seed planter behind minimum tillage tools for tilling and planting in one pass through a field, the cart being equipped with hydraulic operated wheels for transport of both minimum tillage tools and seed planter.

8 Claims, 5 Drawing Figures

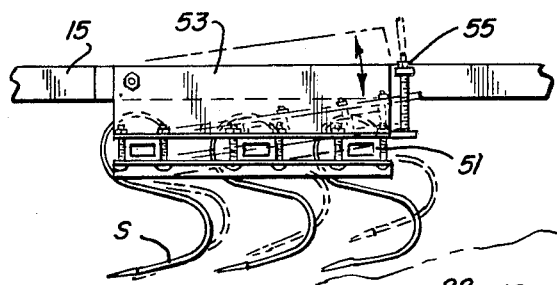
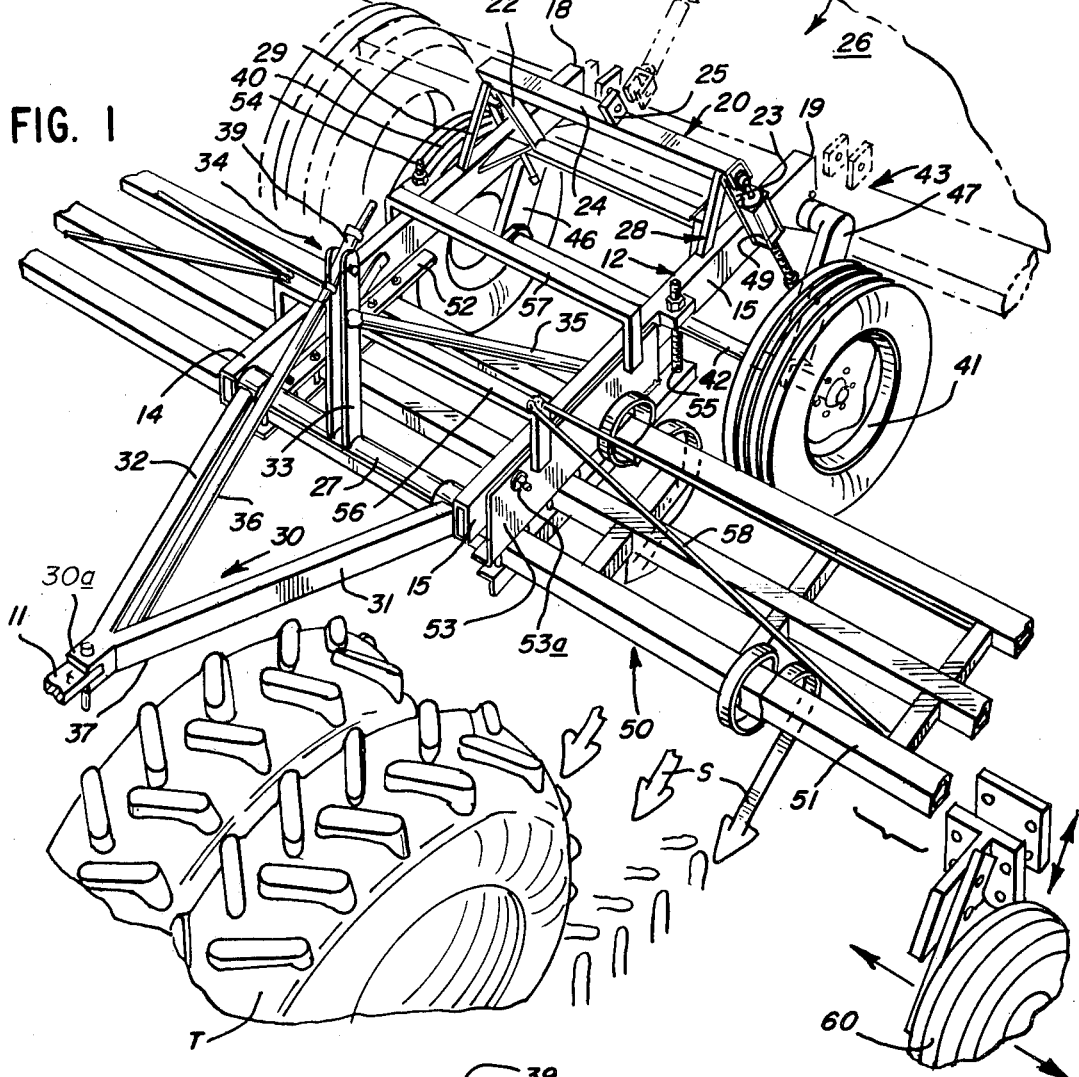
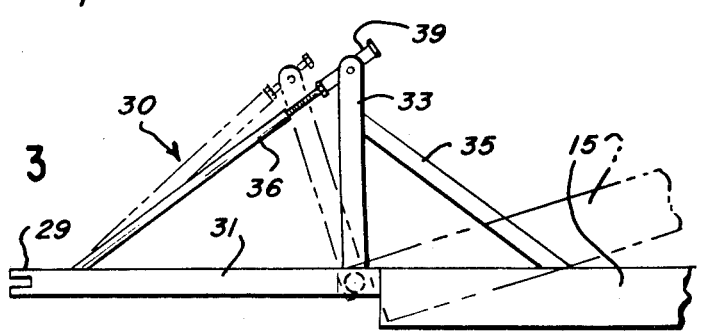

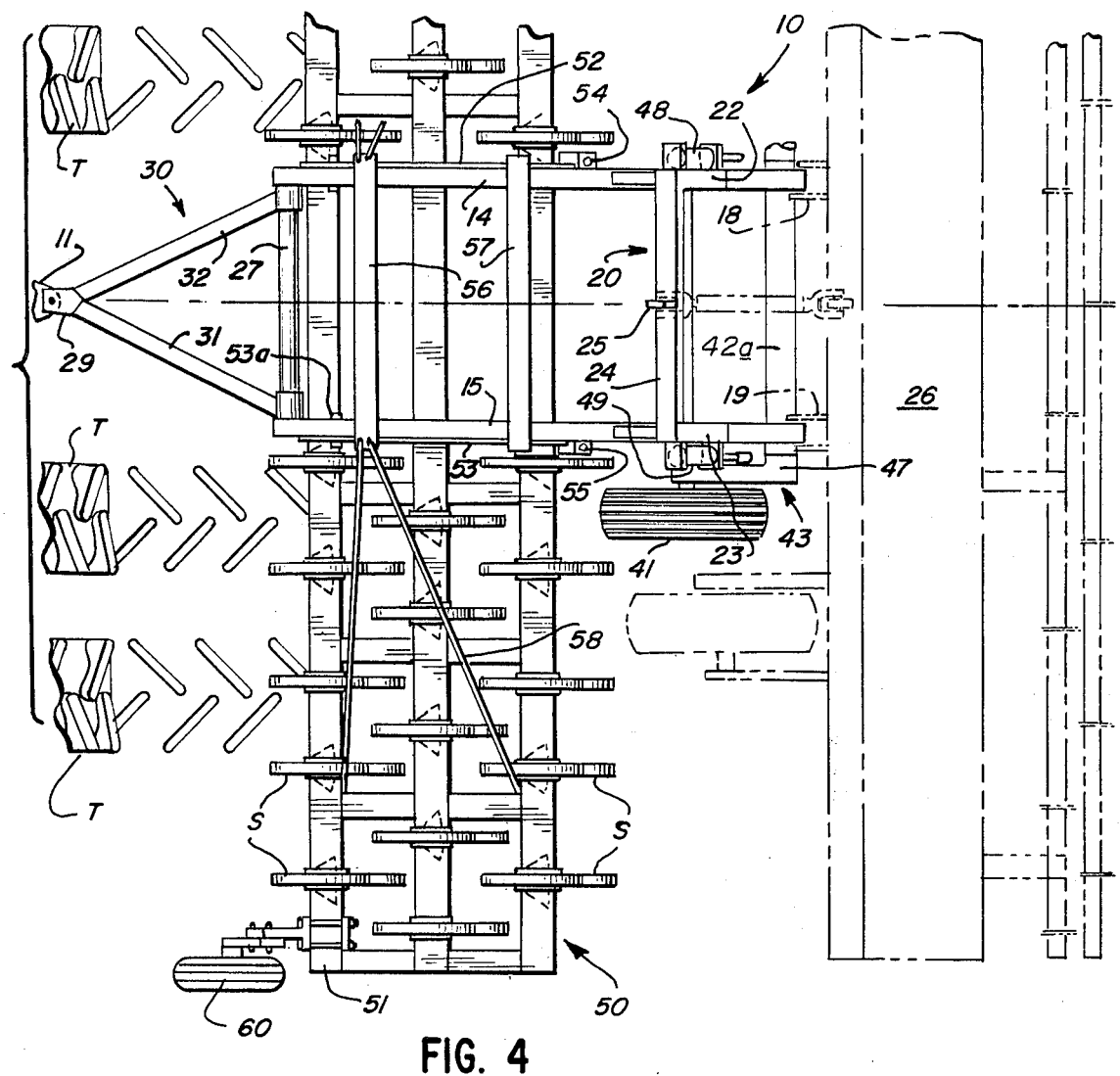
FIG. 4
FIG. 5
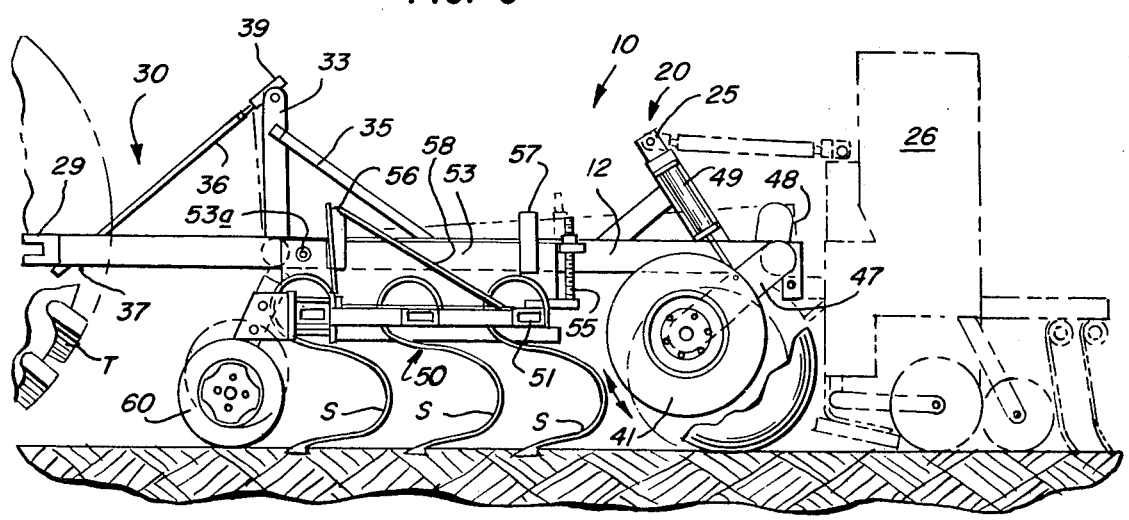

AGRICULTURAL TOOL CART FOR MINIMUM TILLAGE AND SEED PLANTING

BACKGROUND OF THE INVENTION

1. Field of the Invention

This invention relates generally to agricultural implements particularly related to a cart for minimum tillage of the ground followed immediately by planting of seed crops, such as rice, wheat, oats, soy beans, corn and similar grain crops.

2. Background Art

The agricultural process of preparing the ground for receiving grain crops has most frequently involved several separate and distinct operations in the field starting with plowing either in the spring or fall. Plowed ground is generally rough and does not present a smooth level seedbed for the reception of planting operations. Therefore, plowed ground was sometimes disked, harrowed, levelled and otherwise worked with implements to break up the clods, pulverizing the soil to a fine consistency in order to retain moisture and to level the ground in appropriate fashion to receive the seed.

Some efforts at minimum tillage followed immediately by seed planting has resulted in the hanging of some tillage tools essentially on existing structure of seed planters. This practice has not been widespread due to the limitations on both the amount of tillage that can proceed the planter, and the fact that three-point hitch equipped planters are not adaptable to the processes heretofore known.

The present invention is directed to overcoming the limitations of the prior art devices involved in minimum tillage and seed planting in agricultural implements.

SUMMARY OF THE INVENTION

The present invention provides a tractor-pulled agricultural tool cart for use in minimum tilling and planting operations which carries a plurality of tillage tool mounting bars forward of a seed planting implement mounted on the cart at the rear of the cart.

A close relationship between the minimum tillage tool bars and the planting implement allows selectable earthworking tools to be pulled through the ground immediately preceding the seed planter thereby removing the tire tracks of the tractor and providing a properly prepared seed bed. Soil preparation and planting operations can be performed in a single pass through the soil.

The cart has a rear mount adaptable to use a three-point hitch assembly commonly used to attach agricultural implements. The tool cart can be used to carry any common size tillage tool and planting implement.

An adjustable tongue assembly is provided at the front of the tool cart having an adjustment for aid in selecting the depth of the tillage tools in operational position.

Tillage tool mounting bars are adjustably and demountably attached to the tool cart so that the tool bars may be angularly adjusted relative to the ground level, and easily removed or changed.

A pair of power operated wheels are provided for raising the cart and implements to facilitate transporting of the tool bars and the planting implement.

The wheels are moved by hydraulic cylinders in a pivotal motion downward and toward the rear of the cart where the planting implement is attached for positioning the wheels more directly beneath the center of balance of the cart with attached implements thereby reducing the loading at the connection to the tractor.

It is, accordingly, an object of the present invention to provide an agricultural towed cart for carrying a tillage implement proximately forward of a seed planting implement to produce a totally prepared and planted seed bed in one operation.

It is also an object to provide an agricultural towed type cart which is equipped for easily transporting a tillage implement and a seed planting implement attachable by a three-point hitch together and which is adaptable to carry the common sizes of agricultural implement attachable by a three-point hitch assembly in proximity to the common sizes of tillage implement.

It is another object to provide an agricultural tool cart with a means for easily adjusting the position of an integral tillage implement relative to a planting implement carried proximately rearward on the cart to provide for tillage tool ground penetration depth selection, which tool mounting bars are detachably and adjustably mounted to the cart.

A further object is to provide a cart with a pair of transport wheels so positioned that the wheels are below a three-point hitch securing a planter to the cart so as to lift the planter and cart most efficiently.

DESCRIPTION OF THE DRAWINGS

FIG. 1 is a broken perspective view of the present invention showing the cart in transport position being pulled by a tractor partly fragmentary;

FIG. 2 is a fragmentary side plan view of the adjustable tillage tool mounting bar attachment;

FIG. 3 is a fragmentary view from the side of the adjustable tongue attachment;

FIG. 4 is a broken, fragmentary top plan view of the present invention being pulled by a tractor with a conventional seed planting implement shown in phantom.

FIG. 5 is a side upright plan view of the present invention in operational position showing the motions of the transport wheels and the gauge wheels in dotted outline.

DESCRIPTION OF THE PREFERRED EMBODIMENT

Referring to FIGS. 1, 4 and 5, the present invention is a tractor-pulled agricultural tool cart generally designated 10, including a braced cart frame 12 having a pair of longitudinal side beams 14 and 15 spaced apart by a distance generally equal to the spacing of the lower hitch points 18, 19 of a three-point implement hitch.

Tractor tires T are partially illustrated in their general spacial relationship to the cart and its implements when in use. The side beams 14, 15 are rigidly connected at their rear ends by an upright arch brace 20, the connections being adjacent to the lower hitch points 18, 19, respectively, the arch brace including a pair of upright columns 22 and 23 extending upwardly and forwardly from the connections or side beams 14 or 15 substantially aligned with hydraulic cylinders 48 and 49 for purposes of strength. A transverse cross member 24 interconnects the uppermost parts of the upright columns 22, 23, and has an upper hitch point 25 located at the center, projecting upwardly. Two angular braces 28 and 29 extend between the side beams 14, 15 and the upright columns 22, 23 to provide lateral support. The upper hitch point 25 and the two lower hitch points 18, 19 provide a means for attaching a seed planting implement, generally designated as 26, to the rear of the tool cart 10, using a three-point implement hitch. The seed planter may be a drill for rice, wheat, oats or soybean planting or may be another seed crop planter of the type used for planting corn.

A pull-tongue 30 comprising a pair of frame members 31 and 32 is pivotally connected to a tubular cross member 27 connected between the front ends of the side beams 14, 15, as is best shown in FIGS. 3 and 5. The pull-tongue 30 is provided with a bifurcated hitch 30a at the forward end where frame members 31 and 32 converge.

A tool cart height adjustment means for adjusting the upright angular position of the pull-tongue 30 relative to the cart frame 12 includes an upright bracket 33 (FIGS. 1 and 3) attached centrally to the tubular cross member 27, with rearward extending angled braces 34 and 35 connected between bracket 33 and the frame side beams 14, 15. A threaded shaft 36 is pivotally connected to a forward portion 37 of the pull-tongue 30 where the two frame members 31 and 32 converge, and is movably connected to the top of bracket 33 by a thread mating element 39 whereby movement in axial direction of the shaft is imparted to the threaded shaft 36 which rotates the forward portion 37 of the pull-tongue 30 about the pivotal connection with the tubular cross member 27 thereby changing the relative angular position between the pull-tongue 30 and the cart frame 12. When the tool cart 10 is attached to a tractor, supported at the front by a tractor drawbar 11, and the seed planting implement 26 attached to the rear of the cart is lowered to the ground, the change in relative angular position between the pull-tongue and the cart frame will effectively raise or lower the forward part of the tool cart 10 relative to the ground surface.

A power lift mechanism for lifting the tool cart 10 and attached implement 26, best shown in FIGS. 1 and 5, comprises a pair of transport wheels 40 and 41 connected to an axle 42, and a movable support assembly, generally designated 43, for the axle 42, including a pair of supporting arms 46 and 47 each pivoted upon a cart frame transverse cross member 42a. The wheel support arms 46, 47 are pivotally connected to the rear of the frame side beams 14, 15 and directly beneath the lower hitch points 18, 19.

The support arms 46, 47 extend forwardly and downwardly from their respective pivotal connections in the side beams 14, 16 so that the wheels 40, 41 will move downwardly from and toward the rear of the cart frame as the support arms 46, 47 are operationally moved toward an upright position substantially below the lower hitch points 18, 19, as is shown in FIG. 5, the load of the planting implement 26 being transmitted in a downward direction through the upright extending support arms to the wheels, the load bearing wheels being moved directly toward the center of balance as the tool cart 10 is lifted and the wheels becoming positioned below the lower hitch points 18, 19.

A power means for moving the support arms 46, 47 includes a pair of hydraulic cylinders 48, 49 pivotally connected between the support arms and the upright columns 22, 23 of the upright arch brace 20. The cylinders are positioned in substantial alignment with the upright columns so that the columns will be primarily stressed in tension when the support arms 46, 47 are rotated downwardly by the hydraulic cylinders 48, 49 to lift the tool cart 10 and attached implements 26. The cylinders are preferably mounted with the piston rod attached to the wheel support arms as illustrated to utilize the hydraulic power circuit of the tractor to the fullest extent possible.

A tillage tool mounting assembly, generally designated 50, is demountably and adjustably attached to the tool cart frame 12 intermediate the pull-tongue 30 and the wheels 40, 41. The assembly has a plurality of interconnected and mutually braced tillage tool mounting bars 51 extending transversely beneath the cart frame 12 and to each side of the tool cart 10. The tool bars 51 are attached to a pair of upright plates 52, 53 which embrace the side of the cart frame side beams 14 and 15, respectively, in side bearing relation to constrain twisting and bending forces imparted to the tool bars 51 when in operation. The upright plates 52, 53 are pivotally connected to the side beams 14, 15 at their forward end by bolts 52a and 53a, and adjustably connected to the side beams 14, 15 at their rearward end by threaded elements 54, 55 to provide a means of adjustment of the angular position of the tool mounting assembly relative to the cart frame 12. The pull-tongue adjustment means and the tool mounting assembly adjustment means cooperate to provide for tillage tool ground depth selection where the tool cart 10 is in operational lowered position. Any suitable minimum tillage tools such as spring tooth shanks S may be mounted on the bars in arrays to till the ground ahead of the planter.

A pair of transverse braces 56, 57 extending between the upright side plates are provided for increased stability of the tool mounting assembly. Lateral rod braces 58 are provided between the upright plates 52, 53 and the tool mounting bars 51, as is shown in FIGS. 1, 4 and 5.

With reference to FIGS. 1 and 5, an outboard gauge wheel 60 is movably mounted at the forward end of one of the tool mounting bars 51 to provide for additional height control of the tillage tool mounting assembly and to aid in keeping the tool assembly even and level with the ground during operation. Adjustments in gauge wheel height and lateral location may be made by the bolted-on attachment of the wheel assembly to the tool bar.

I claim:

1. A tractor-pulled agricultural tool cart for accomplishing minimum tillage and grain crop planting in a single pass through a field, comprising:
    a cart frame having two spaced apart side beams, means at the rear of each beam to receive a lower hitch point of a seed planter;
    an upright arch brace connecting said beams adjacent said lower hitch point receiving means and means providing an upper hitch point receiving means at the center of the arch;
    a lifting assembly on the cart for raising the cart and a three-point hitch equipped seed planter implement when attached to said hitch point receiving means, said assembly having a pair of wheels on an axle, a movable support for said axle including arms movably connected to said beams adjacent said lower hitch points and power means for moving said arms about said connection to lower said wheels relative to said beams and to elevate the beams relative to ground; and
    a tillage tool mounting assembly including elongate tool mounting bars braced to each other and secured to a pair of upright mounting plates spaced to embrace said cart beams, means mounting said plates to the cart beams for carrying the tool mounting assembly on the cart, said bars carrying outboard gauge wheels to level the tillage tool assembly relative to ground during tilling operations, said cart being capable of elevation to raise such tillage tool mounting assembly and said seed planter together for transport upon the cart wheels.

2. An agricultural tool cart as specified in claim 1 wherein said wheel support arms are connected to a cross member journalled at the rear of said cart side beams and said arms lowering said wheels extending upright beneath the rear of said beams so as to lift the weight of an attached planter implement immediately adjacent the lower three-point hitch points.

3. An agricultural tool cart of claim 1 wherein said means of detachably mounting the tillage tool mounting bars comprises said pair of upright plates in side bearing relation to said side beam members, pivotally connected to the side beam members at one end and adjustably connected to the side beam members at the other end thereby providing a means of adjusting the angular position of the tool mounting bars relative to the frame and a means of constraining side loads imparted to the tool mounting bars.

4. The agricultural tool cart of claim 1 wherein said lifting assembly wheel supporting arms are pivotally connected to the rear of said frame and said arms extend forwardly and downwardly from such pivot connection so that the wheels may be moved downwardly from and toward the rear of said frame as the supporting arms are operationally moved toward an upright position by said power means.

5. An agricultural implement cart for seed planting behind minimum tillage, comprising:
- a braced cart frame including longitudinally extending beams each having a lower hitch point of a three-point hitch at its rear;
- an upright arch brace connecting the rearward portions of said beams and having a central upper hitch point of a three-point hitch thereon, said hitch points providing means for attaching a three-point hitch equipped seed planter implement to the rear of the cart;
- powered lifting mechanism at the rear of said beams including a pair of wheels movable in an upright direction relative to the cart to lift the cart and seed planter when attached thereto;
- a pull-tongue pivotally attached to the front of the cart frame;
- means for adjusting said pull-tongue in upright angular relation to the cart frame and securing said tongue in adjusted position;
- and a tillage tool mounting assembly adjustably secured in upright direction to the cart frame intermediate said tongue and power lifting mechanism, said assembly including elongate tool mounting bars extending to each side of the cart frame for mounting tillage tools to till ground in the path of a seed planter mounted on the cart.

6. An agricultural implement cart as specified in claim 5 in which the upright arch brace comprises a horizontal cross member above the frame beams and an upright column connecting the cross member to each frame beam, said columns extending upwardly and forwardly from the beams and power cylinders secured to the cross member adjacent each column to lower said wheels, said cylinders and columns extending generally in like direction relative to said beams primarily stressing said columns in tension upon lifting of the cart and implements.

7. An agricultural implement cart as specified in claim 5 wherein the tillage tool mounting assembly includes a pair of upright plates each embracing a side of one cart frame beam, said tool mounting bars being secured to said plates, means adjustably securing said plates to said beams for height adjustment of the assembly to ground, said assembly being raised and lowered with the cart.

8. An agricultural implement cart as specified in claim 5 wherein said tillage tool mounting assembly is pivotally attached to the front portion of the cart frame and height adjustment means is provided between the assembly and the cart frame to pivot said assembly about said pivotal attachment, said pull-tongue adjustment means and tool mounting assembly adjustment means together providing for tillage tool ground penetration depth selection.

* * * * *